US009580969B2

(12) United States Patent
Wardley et al.

(10) Patent No.: US 9,580,969 B2
(45) Date of Patent: Feb. 28, 2017

(54) CUTTING ASSEMBLY SUITABLE FOR USE ON A DRILLABLE DRILL BIT

(75) Inventors: Michael Wardley, Aberdeen (GB); Mitchell Bavidge, Aberdeen (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 619 days.

(21) Appl. No.: 13/702,917

(22) PCT Filed: Jun. 1, 2011

(86) PCT No.: PCT/GB2011/051036
§ 371 (c)(1),
(2), (4) Date: Mar. 13, 2013

(87) PCT Pub. No.: WO2011/154721
PCT Pub. Date: Dec. 15, 2011

(65) Prior Publication Data
US 2013/0175097 A1    Jul. 11, 2013

(30) Foreign Application Priority Data

Jun. 9, 2010 (GB) .................................. 1009661.8

(51) Int. Cl.
*E21B 10/573* (2006.01)
*E21B 17/14* (2006.01)
*E21B 10/43* (2006.01)
*B23K 1/20* (2006.01)

(52) U.S. Cl.
CPC .............. *E21B 10/573* (2013.01); *B23K 1/20* (2013.01); *E21B 10/43* (2013.01); *E21B 17/14* (2013.01)

(58) Field of Classification Search
CPC ............................... E21B 17/14; E21B 10/573
See application file for complete search history.

(56) References Cited

U.S. PATENT DOCUMENTS

| 3,459,073 A | 8/1969 | Conover |
| 4,743,137 A | 5/1988 | Bucher et al. |
| 2005/0183892 A1* | 8/2005 | Oldham et al. ............... 175/402 |

FOREIGN PATENT DOCUMENTS

| EP | 0 141 195 A1 | 5/1985 |
| WO | 94/15059 A1 | 7/1994 |
| WO | 99/64713 A1 | 12/1999 |
| WO | 01/46550 A1 | 6/2001 |
| WO | 2005/080742 A1 | 9/2005 |
| WO | 2008/027484 A1 | 3/2008 |

OTHER PUBLICATIONS

Silver Brazing Alloys, Retrieved from http://princeizant.com/silver-brazing-alloys on Mar. 1, 2016.*
Copper Brazing Alloys, Retrieved from http://princeizant.com/copper-brazing-alloys on Mar. 1, 2016.*
(Continued)

*Primary Examiner* — Robert E Fuller

(57) ABSTRACT

A cutting assembly suitable for use on a drillable drill bit includes one or more cutting members comprising pre-formed pockets. A set of one or more cutters are located within the pre-formed pockets. A detachment facilitating feature is located at the interface between the cutting members and the cutters.

11 Claims, 4 Drawing Sheets

(56) References Cited

OTHER PUBLICATIONS

Silver Brazing Alloys, Retrieved from http://princeizant.com/silver-brazing-alloys on Aug. 3, 2016.*
Combined Search and Examination Report issued Jan. 9, 2013 in corresponding GB application No. 1217436.3 (5 pages).
International Search Report from PCT/GB2011/051036 mailed on Nov. 30, 2012 (2 pages).
Written Opinion of the International Searching Authority from PCT/GB2011/051036 mailed on Nov. 30, 2012 (6 pages).

* cited by examiner

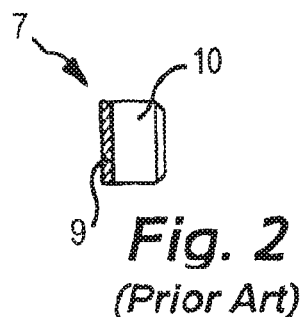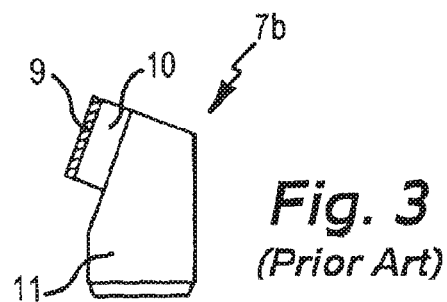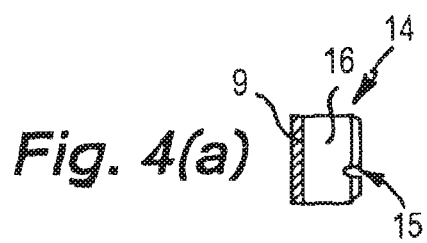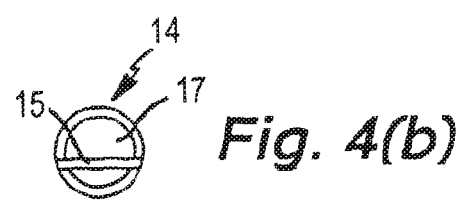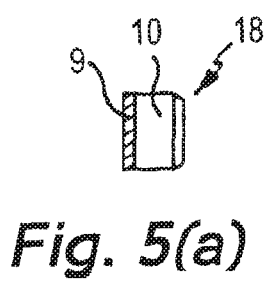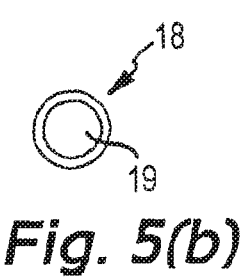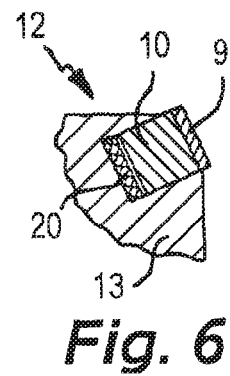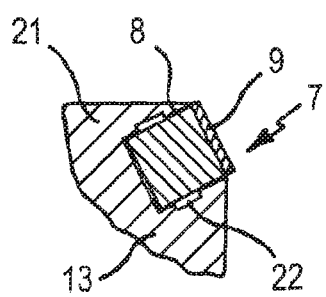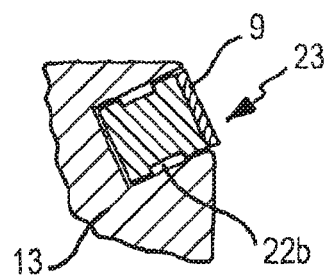

CUTTING ASSEMBLY SUITABLE FOR USE ON A DRILLABLE DRILL BIT

The present invention relates to the field of hydrocarbon exploration. More specifically, the present invention concerns the provision of a cutting assembly suitable for use on a drillable drill bit.

When drilling subterranean formations for the purpose of hydrocarbon exploration it is known in the art to initially drill a first section of a well bore having a first diameter and thereafter to remove the drill bit from the well bore. A first tubular member of lesser diameter, known as casing string, is then placed in the well bore and subsequently the annulus between the well bore and the outside of the casing string is filled with a cement. The purpose of the cement is to isolate certain of the subterranean strata from each other. The next stage of the operation involves passing a second drill bit, having a smaller diameter than the first, through the casing string so as to permit the drilling of a second section of the well bore beyond the previously attained depth of the first section. This sequence is repeated as many times as necessary, with smaller and smaller components, until the ultimate desired depth of the well bore is achieved.

Positioned at the end of each casing string is a rounded guiding component known as a shoe. Typically, the leading edge of the shoe is constructed from cement, to enable it to be easily drilled through by the next drill bit.

The cost of oil exploration particularly in offshore regions is extremely high. Thus it is in the interest of the operator to minimise the time taken to form a well bore. At great depths, the round trip time to pull out a drill bit and replace it with another one can be many hours. This "trip" time is seen as non-productive and wasteful, and a significant advantage can be gained, if, having drilled to target depth the drill bit does not have to be removed from the well bore. In this way, a trip could be saved.

A proposed solution known in the art is to attach the drill bit to the leading end of the casing string, drill to a target depth and then cement the casing string. Certain advances in recent years have rendered this solution more viable, including the provision of premium casing threads that are able to take the necessary drilling torque, and rotary top drives able to transmit the torque directly to the trailing end of a casing string are now commonplace.

A typical casing drill bit 1 employed in this process is presented in FIG. 1. The drill bit 1 is shown mounted to one end of a cylindrical body 2 via a first thread end connection 3 suitable for mating with the body 2. The opposite end of the cylindrical body 2 is then mounted on the lower end of a drilling string (not shown) via a second thread end connection 4 suitable for mating with the drill string.

Unlike conventional or standard drill bits, which are traditionally made from so called hard materials such as steel or tungsten carbide matrix, casing drill bits 1 are generally made from a softer material, such as aluminium, so as to facilitate a drill through process, as described in further detail below. Both conventional and casing drill bits 1 often comprise cutting members 5 (often referred to as blades) located at the opposite end of the drill bit 1 to the first thread end connection 3, namely at the end where a crown 6 is located. The cutting members 5 extend out from the crown 6 and each cutting member 5 can be seen to comprise a plurality of preformed cutters 7 located within corresponding pre-formed pockets 8 along a "leading edge" of the cutting members 5. In this respect the "leading edge" refers to the side of the cutting members 5 which directly contacts the ground or rock formation upon rotation of the drill bit 1.

Further detail of a typical preformed cutter 7 employed with the casing drill bit 1 or a conventional drill bit is provided in FIG. 2. The preformed cutters 7 can be seen to comprise a layer of polycrystalline diamond (PCD) 9 mounted upon a support 10. The support 10 may comprise tungsten carbide or cubic boron nitride. FIG. 3 presents an alternative form of the preformed cutters 7b which also employs a post 11. The post 11 may also comprise tungsten carbide or cubic boron nitride.

Traditionally, the preformed cutters 7 are attached to the cutting member 5 by one of two basic methods. The first method involves the cutters 7 being brazed within the pre-formed pockets 8 by means of a suitable braze alloy. Alternatively, the cutters 7 may be press fitted or shrunk fitted with the pre-formed pockets 8. In a desire for ruggedness and longevity for the drill bit 1 the cutters 7 are generally attached to the cutting members 5 by the most secure method possible. A significant amount of research has been spent in developing attachment methods that ensure the cutters 7 remain attached throughout a drilling operation. Indeed, many conventional drill bits are used to drill multiple well bore sections and the cutters 7 must be retained throughout the entire lifecycle of the drill bits.

A limiting factor in many of the traditional techniques known in the art is the form of the conventional drill bits. By design, these drill bits are generally robust devices designed to withstand the rigours of a downhole environment and, as described above, they are made from so called hard materials. If such a drill bit were to be employed within the above described casing string drilling technique then after cementing of the casing string the subsequent drill bit would have to pass through the first drill bit before exiting the end of the casing string. However, modern drill bits optimised for rock removal are generally unable to drill through the materials from which they themselves are constructed without sustaining a level of damage which would render the task of drilling the next section of rock formation impossible.

It is possible to drill through these traditional drill bits with a special tool known as a mill, but these tools are unable to effectively penetrate the subsequent rock formations and so the mill has to be removed from the well bore and replaced with an appropriate drill bit. In these circumstances, the trip saving advantage gained by drilling with the casing string would be lost.

An alternative solution to the above problem is described within PCT application number PCT/GB99/01816. Here a casing drilling shoe is disclosed which is adapted for attachment to the casing string. The drilling shoe comprises an outer drilling section constructed from a relatively hard material e.g. steel, which incorporates a cutting structure made from polycrystalline diamond (PCD) or tungsten carbide matrix. The tool further comprises an inner section constructed from aluminium which is a material known to be readily drillable. The casing drilling shoe further comprises a means for controllably displacing the outer drilling section to a radial position whereby it does not interfere with any subsequent drilling of the shoe. This enables the aluminium inner section to be drilled through using a standard drill bit and subsequently penetrated by a reduced diameter casing string.

The casing drilling shoe described in PCT application number PCT/GB99/01816 is extremely expensive to produce due to the requirement to incorporate a displaceable outer drilling section. In practice, these tools are also found to be sensitive to vibration and so they are not particularly robust which can cause mechanical failure during the drilling process. A further drawback of the described tool is the use of aluminium for the inner section. As with steel, when aluminium is drilled it tends to form into long strands. These strands then wrap themselves around the secondary drill bit so reducing the efficiency of any subsequent drilling process. Furthermore, aluminium is easily eroded by the action of the drilling fluids which are necessarily used to clean the well bore.

An alternative casing string drill bit is described in PCT application number PCT/GB00/04936. The described casing string drill bit is again constructed from a combination of a relatively soft (drillable) material and a relatively hard material. In particular, the described drill bit comprises a crown upon which are mounted a plurality of cutting members. The crown and cutting members are constructed from a relatively soft material such as aluminium, copper, nickel or a brass alloy. The cutting members are substantially covered by fragments of a relatively hard material such as tungsten carbide, PCD or cubic boron nitride. When a second drill bit is employed to drill through the described casing string drill bit the second drill passes through the relatively soft material and causes the fragments of the relatively hard material to fall away from the crown of the tool. The fragments are then subsequently removed from the well bore by the circulating drilling fluid.

In practice, and as recognised within the application itself, direct application of the relatively hard coatings to the crown and cutting member materials is difficult and in some combinations are just not practical. For example, extremely hard tungsten carbide particles cannot easily be applied to crown sections when these are made from aluminium. It is also recognised within the application that the described drill bit is not readily suitable for drilling through hard formations. When deployed with hard formations the fragments of the relatively hard material tend to be sheared away from the crown section, thus quickly reducing the efficiency of the drilling process.

A third solution presented in the prior art is that described within PCT application number PCT/US2005/004106. The described casing bit system is of a similar form to that described within PCT application number PCT/GB00/04936 however the tool now comprises a steel alloy crown upon which are mounted a plurality of cutting structures made from PDC or tungsten carbide. To facilitate drilling through the casing bit its inner surface is profiled so as to be suitable for receiving a bespoke secondary drill bit having a complementary outer surface profile that matches the inner surface profile of the casing bit.

To avoid damage when drilling through the steel alloy crown the cutters of the secondary drill bit are required to have of a low blade height. However, as is recognised in the art, lower blade heights generally result in lower drilling rates. Thus the rate at which the subsequent subterranean formations can be drilled by the secondary drill bit of this system is reduced.

The document also teaches that it is advantageous for the drill through process to modify the materials from which cutting structures are made, particularly those located within the region configured to be drilled through e.g. by making the average amount of abrasive material contained in these regions less than the average amount of abrasive material contained by each of the cutting elements within the peripheral regions; or alternatively by forming the cutting elements in this region from a substantially carbide-free material. Such modifications to the casing bit however can be detrimental to the rate at which it can drill the subterranean formations and also the distance that the drill bit may drill before wearing out.

The requirement of a bespoke secondary drill bit to drill through the casing systems of PCT application number PCT/US2005/004106 also has obvious disadvantages since in the absence of such a bit the drilling operation is required to be suspended. In such circumstances it is known for operators to simply employ a standard oilfield drill bit to which they have access to in order to attempt to drill through the casing bit. This can result in the mechanical failure of the standard drill bit leading to increased down time as the damaged drill bit and associated debris have to be removed from the well bore. Furthermore, the design of the bespoke secondary drill bit may not be ideally suited to the particular formations that need to be drilled in the section below the casing drill bit.

It is recognised in the present invention that considerable advantage is to be gained in the provision of cutters that can be retained upon a drillable drill bit during a drilling operation whilst facilitating detachment from the drill bit during a drill out procedure.

It is therefore an object of an aspect of the present invention to obviate or at least mitigate the foregoing disadvantages of the drill bits known in the art.

SUMMARY OF INVENTION

According to a first aspect of the present invention there is provided a cutting assembly suitable for use on a drillable drill bit wherein the cutting assembly comprises one or more cutting members comprising one or more pre-formed pockets and one or more cutters located with the pre-formed pockets wherein the cutting assembly further comprises one or more detachment facilitating features located at the interface between the cutting members and the cutters.

The introduction of detachment facilitating features allows for the provision of one or more cutters that can be retained upon the drillable drill bit during a normal drilling operation whilst facilitating detachment of the cutters from the drill bit during a subsequent drill out procedure.

The one or more detachment facilitating features may comprise a structural defect located on the surface of the cutter. The structural defect is located on the surface of the cutter so as to provide a means for unidirectionally weakening the cutter. The structural defect may be in the form of a groove.

Alternatively, the one or more detachment facilitating features may comprise an area of reduced brazing capacity.

Such an area may be provided by the introduction of a non brazeable plating of layer located on the outer surface of the cutter or the pre-formed pockets. Alternatively the area may be provided by the introduction of a non brazeable material between the cutter and the pre-formed pockets.

In a further alternative embodiment the area of reduced brazing capacity comprises the incorporation of one or more gaps between the cutter and the pre-formed pocket. The one or more gaps may comprise a recess formed on the outer surface of the cutter or the pre-formed pocket.

A yet further alternative embodiment is for the area of reduced brazing capacity to comprise the incorporation of a non optimal braze alloy.

The one or more detachment facilitating features may alternatively comprise wherein the one or more gaps incorporated between the cutter and the pre-formed pocket arranged so as to reduce the area of interference between the cutter and the pre-formed pocket.

The one or more gaps may comprise a recess formed on the outer surface of the cutter or the pre-formed pocket.

Optionally the recess formed on the outer surface of the cutter or the pre-formed pocket forms relief chamber.

Preferably the relief chamber is hermetically sealed. As a result a volume of air at atmospheric pressure is trapped within the relief chambers so as to assist in the detachment process of the cutters.

The one or more detachment facilitating features may alternatively comprise a drillable post. Preferably the drillable post comprises a first section that provides a means for attaching the drillable post to the pre-formed pocket. The drillable post may further comprise a second section having a part pocket suitable for receiving the cutter.

According to a second aspect of the present invention there is provided a method of forming a cutting assembly suitable for use on a drillable drill bit wherein the method comprises the steps of:

providing one or more cutting members comprising one or more pre-formed pockets;
    locating one or more cutters within the pre-formed pockets;
    providing one or more detachment facilitating features at the interface between the cutting members and the cutters.

The step of providing the one or more detachment facilitating features may comprise providing a structural defect on the surface of the cutter.

Alternatively the step of providing the one or more detachment facilitating features may comprise providing an area of reduced brazing capacity.

The step of providing an area or reduced brazing capacity may comprise introducing a non brazeable plating of layer on the outer surface of the cutter or the pre-formed pockets.

Alternatively the step of providing an area or reduced brazing capacity may comprise introducing a non brazeable material between the cutter and the pre-formed pockets.

In a further alternative embodiment the step of providing an area or reduced brazing capacity may comprise introducing one or more gaps between the cutter and the pre-formed pocket. The one or more gaps may comprise a recess formed on the outer surface of the cutter or the pre-formed pocket.

A yet further alternative embodiment is for the step of providing an area of reduced brazing capacity to comprise incorporating a non optimal braze alloy.

Alternatively the step of providing the one or more detachment facilitating features may comprise providing one or more gaps between the cutter and the pre-formed pocket arranged so as to reduce the area of interference between the cutter and the pre-formed pocket.

The one or more gaps may comprise a recess formed on the outer surface of the cutter or the pre-formed pocket.

Optionally the gaps introduced between the cutter and the pre-formed pocket form relief chambers.

Alternatively the step of providing the one or more detachment facilitating features may comprise providing a drillable post between the cutting members and the cutters.

Embodiments of the second aspect of the invention may comprise features to implement the preferred or optional features of the first aspect of the invention or vice versa.

According to a third aspect of the present invention there is provided a cutter suitable for use on a drillable drill bit wherein the cutter comprises one or more detachment facilitating features arranged to locate at the interface between the cutters and the drill bit.

Embodiments of the third aspect of the invention may comprise features to implement the preferred or optional features of the first and second aspects of the invention or vice versa.

According to a fourth aspect of the present invention there is provided a cutting member suitable for housing one or more cutters on a drillable drill bit wherein the cutting member comprises one or more pre-formed pockets and one or more detachment facilitating features arranged to locate at the interface between the cutting member and the cutters.

Embodiments of the fourth aspect of the invention may comprise features to implement the preferred or optional features of the first, second and third aspects of the invention or vice versa.

BRIEF DESCRIPTION OF DRAWINGS

Aspects and advantages of the present invention will become apparent upon reading the following detailed description and upon reference to the following drawings in which:

FIG. 2 presents a side view of a known cutter employed with the drill bit of FIG. 1;

FIG. 3 presents a side view of an alternative known cutter employed with the drill bit of FIG. 1;

FIG. 4 presents:
(a) a side view; and
(b) a bottom view,
of a cutter comprising a structural defect;

FIG. 5 presents:
(a) a side view; and
(b) a bottom view,
of a cutter comprising a non-brazeable plating or layer;

FIG. 6 presents a cross sectional view of a cutting assembly comprising a non brazeable spacer;

FIG. 7 presents a cross sectional view of the cutter of FIG. 1 located within a pre-formed pocket of a cutting member, the pre-formed pocket comprising a reduced brazing surface area;

FIG. 8 presents a cross sectional view of a cutter comprising a reduced brazing surface area located within a pre-formed pocket;

DETAILED DESCRIPTION

Figure 1A:
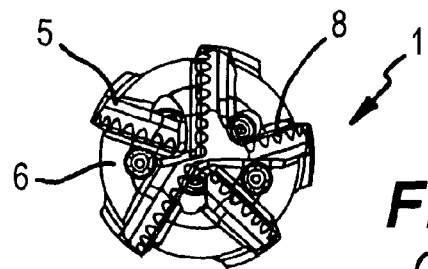
FIG. 1 presents:
(a) a top view;
(b) a side view; and
(c) a cross section,
of a drill bit known in the art.
Figure 1B:
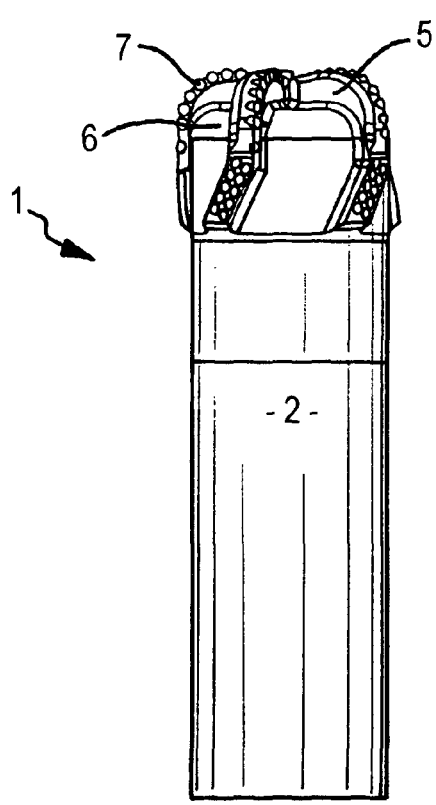
Figure 1C:
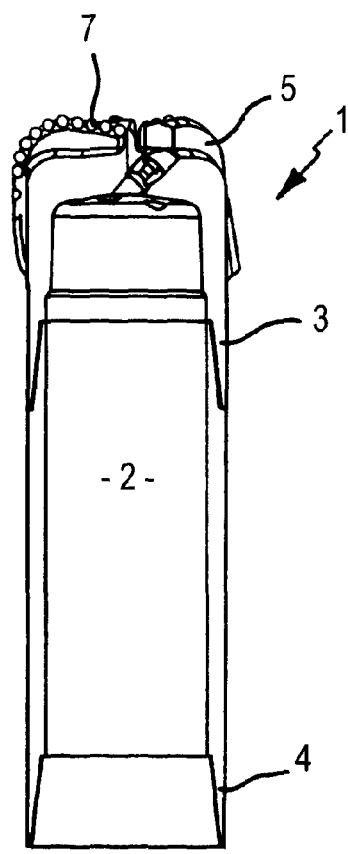

As discussed above, when developing a casing drill bit 1 it is important that the cutting assembly 12 i.e. the combination of the cutting members 5 and the attached cutters 7 is as robust as possible. This is to ensure that the cutting forces, and more importantly the impact forces experienced by the drill bit 1 do not cause the cutters 7 to chip or fracture or be sheared from the cutting members 5. For a drillable drill bit, represented generally in the following description by the reference numeral 13, these considerations are obviously still important. However, during a drill out operation the forces attempting to dislodge the cutters 7 from the body of the drill bit 13 have an opposite orientation to the normal drilling forces. This effect can be exploited by introducing a detachment facilitating feature at the interface between the cutters and the cutting members in order to provide a drillable drill bit 13 comprising cutters that can be retained upon a drillable drill bit 13 during a normal drilling operation whilst facilitating detachment of the cutters from the drill bit 13 during a drill out procedure.

In the following described embodiments the body of the drill bit 13 and the cutting members are preferably made from bronze or alternatively steel. By making the drill bit and cutting members from bronze allows for the drill bit to be drilled through from the proximal side by a conventional drill bit suited to drill the next rock formation section. Furthermore, the employment of bronze has the further advantage that when drilled it reduces to shavings. These shavings are then carried away by a drilling fluid and so do not act as an obstruction to any subsequent apparatus that is advanced into the well.

An example of a suitable detachment facilitating feature at the interface between the cutters and the cutting members will now be demonstrated with reference to FIG. 4. In particular, FIG. 4 presents a side view and a bottom view of a cutter 14 that comprises a predetermined structural defect 15. The cutter 14 again comprises a layer of PCD 9 mounted upon a support 16. However, in the presently described embodiment the support 16 has been unidirectionally weakened by the incorporation of the structural defect 15 which may be in the form of a groove on the bottom face 17 of the support 16.

The cutters 14 may be brazed within the pre-formed pockets 8 of the cutting members 5 by means of a suitable braze alloy. Alternatively, the cutters 7 may be press fitted or shrunk fitted within these pre-formed pockets 8. During a normal drilling operation the presence of the structural defect 15 has no effect on the robustness of the drill bit 13 as they are in a compressive stress environment. However, during a drill out operation the situation changes. As the drill out bit encounters the bottom face 17 of the cutter 14 a high tensile strength is generated in the root of the structural defect 15. This tensile stress results in a crack propagating through support 16, thereby facilitating the release of the cutter 14 from the body of the drill bit 13.

It will be appreciated by those skilled in the art that the cutters 7 described above, and within the following embodiments, may be attached to the body of the drill bit 13 via pre-formed pockets 8 formed directly on the crown 6 of the drill bit 13 i.e. cutting members 5 need not take the form of raised blades on the crown 6 of the drill bit 13 but instead are integrated directly on the surface of the crown 6.

As discussed above, the quality of the braze bond anchoring the cutters 7 in the pre-formed pockets 8 of the cutting members 5 is of significant importance. In the traditional drill bits 1 the bond strength is chosen to be as high as possible. However for a drillable drill bit 13 there is an optimum bond strength which is that which is just sufficient to retain the cutters 7 in their associated pre-formed pockets 8 for the duration of a drilling process. A number of cutting assemblies will now be described which incorporate a detachment facilitating feature that allows for the brazing retention forces between the cutter and the cutting members to be tailored for a particular drilling process.

One option is to render certain areas of the cutting assembly 12 as unbrazeable, or brazeable with a reduced bond strength. An example is provided in FIG. 5 where a side view and a bottom view of a cutter 18 that comprises a PDC layer 9 and a carbide support 10 is presented. Located on the bottom face 17 of the cutter 18 is a plating or layer 19 of a non brazeable material. One such suitable material for the non brazeable plate or layer 19 is titanium nitride.

A second example, as presented in FIG. 6, involves locating a spacer 20 made from a non brazeable material between the cutter 7 and the cutting member 5. One such suitable material for the spacer 20 is a ceramic plate.

Another factor known to contribute to a strong braze bond is the provision of an optimal gap between the components to be bonded. A maximum braze bond between a cutting member 5 and a cutter 7 would normally be achieved when the gap between these components is in the range of 0.05 to 0.10 mm. Therefore, by manipulating the gap between the cutting member 5 and a cutter 7 the strength of the bond between these components can be controlled.

A first example of this gap manipulation is presented in FIG. 7 where a cross sectional view of the cutter 7 located within a cutting member 21 is presented. In particular, the pre-formed pockets 8 of the cutting member 21 comprise a recess 22, in the form of a cylindrical channel that exhibits a larger diameter than the diameter of the pre-formed pockets 8 itself. In this way a larger braze gap is produced which reduces the strength of the bond between the cutter 7 and the cutting member 21.

In an alternative embodiment, shown in FIG. 8, the recess 22b is provided on the outer surface of a cutter 23, the recess being in the form of a cylindrical channel that exhibits a smaller diameter than the diameter of the cutter 23. In FIG. 8 the cutter 23 is shown located within the pre-formed pocket 8 of a cutting member 5. In a similar manner to that described above, a larger braze gap is produced which again reduces the strength of the bond between the cutter 23 and the cutting member 5.

It will be appreciated by those skilled in the art that alternative embodiments may comprise two or more recesses 22 within the pre-formed pockets 8 of the cutting members 21, two or more recesses 22b on the outer surface of the cutter 23, or a combination of one or more of these recesses 22 and 22b. In a yet further alternative, the recesses 22 and 22b may exhibit a variety of cross sections and need not necessarily extend around the entire perimeter of the cutting members 21 or the cutters 23, respectively.

A yet further alternative would be to employ a non optimal braze alloy that is compatible with the cutters and the cutting member. One example would be where commercially available Silver-flo 452™ 452, a specialised metal brazing filler comprising 45% Silver, 27% Copper, 25.5% Zinc, 2.5% Tin, would traditionally be employed as the braze alloy. In these circumstances this alloy could be substituted by a braze alloy that provides a lower bond strength e.g. Silver-flo 56 a specialised metal brazing filler comprising 56% Silver, 22% Copper, 17% Zinc, 5% Tin.

The incorporation of the predetermined recesses 22 and 22b may also be employed within drill bits 13 where interference fit methods e.g. press fitting and shrink fitting, are employed to retain the cutters 7 mounted on posts 11 within the cutting members 5. It is known that the quality of an interference fit relies on the residual compressive forces between the components involved, in the present case the posts 11 and the pre-formed pockets 8 of the cutting members 5. In order for the posts 11 to remain anchored within the cutting members 5 it is normally desirable to maximise the interference between these components. However, for a drillable drill bit 13 there is an optimum interference force which is that which is just sufficient to retain the cutters 7 in their associated pre-formed pockets 8 for the duration of a drilling process. A number of cutting assemblies will now be described that incorporate a detachment facilitating feature which allow for the interference retention force between the posts 11 and the cutting members to be tailored for a particular drilling process.

Figure 9:
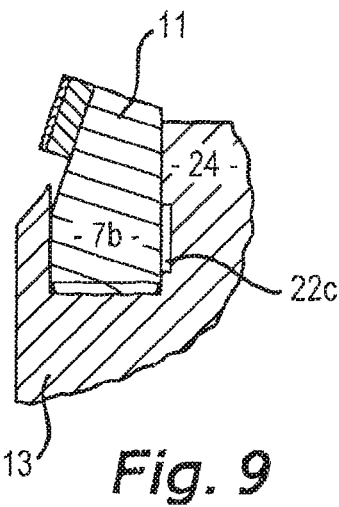
FIG. 9 presents a cross sectional view of the cutter of FIG. 2 located within a pre-formed pocket of a cutting member, the pre-formed pocket comprising a reduced interference surface area.

FIG. 9 presents a cross sectional view of the cutter 7b located within an alternative cutting member 24. In this embodiment the pre-formed pockets 8 of the cutting members 24 comprise a machined recess 22c. The presence of the machined recess 22c acts to reduce the interference area between the posts 11 of the cutters 7b and the cutting members 24. Thus careful control of the machined recesses 22c provides a means for manipulating the interference force between the cutters 7b and the cutting members 24.

Figure 10:
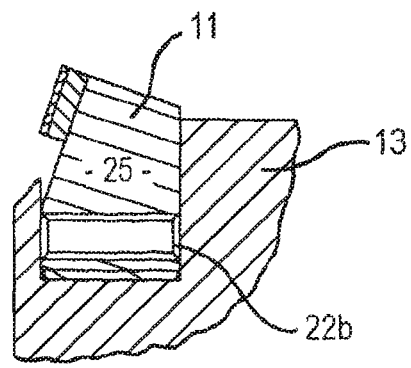
FIG. 10 presents a cross sectional view of a cutter comprising a reduced interference surface area located with a pre-formed pocket.

In an alternative embodiment, shown in cross section within FIG. 10, a cutter 25, having a cylindrical channel type recess 22b on the outer surface of its post 11 is shown located within the pre-formed pockets 8 of a cutting member 5. In a similar manner to that described above, the presence of the machined recess 22b acts to reduce the interference area between the posts 11 and the cutting members 5. Thus careful control of the machined recesses 22b provides a means for manipulating the interference force between the cutters 25 and the cutting members 5.

It will be appreciated by those skilled in the art that alternative embodiments may comprise two or more machined recesses 22c within the pre-formed pockets 8 of the cutting members 24, two or more machined recesses 22b on the outer surface of the posts 11 of the cutters 25, or a combination of one or more of these machined recesses 22b and 22c. In a yet further alternative, the machined recesses 22b and 22c may exhibit a variety of cross sections and need not necessarily extend around the entire perimeter of the pre-formed pockets 8 of the cutting members 24 or the c of the cutter 25, respectively.

Figure 11A:
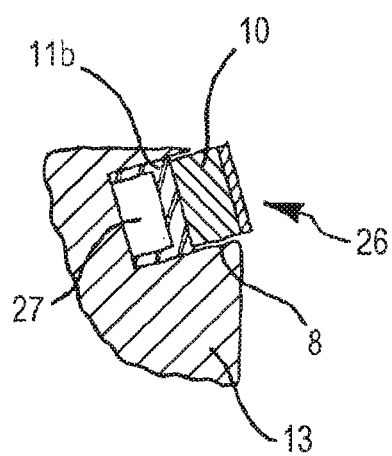
FIG. 11 presents cross sectional views of cutters comprising relief chambers located within:
(a) a post of the cutter;
(b) a support of the cutter; and
(c) a cutting member.
Figure 11B:
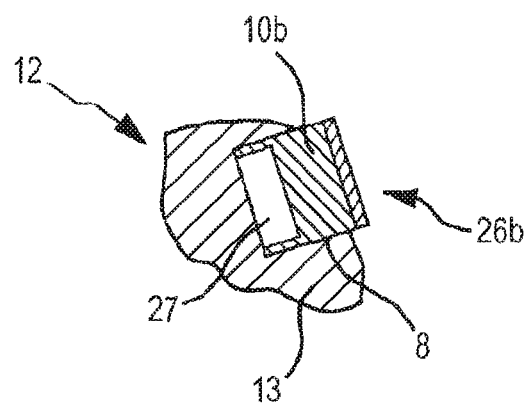

Yet further alternative embodiments, shown in cross section within FIGS. 11(a) and 11(b) involve cutters 26 and 26b located within a pre-formed pocket 8 of the cutting member 5 that incorporate a relief chamber 27. In the presently described embodiments the relief chamber 27 may comprises a machined recess located on the bottom face 17 of a post 11b that is attached to a support 10, see FIG. 11(a). Alternatively, the relief chamber 27 may be formed directly on the bottom face of the support 10b, see FIG. 11b. During the drill out process the outer surface of the post 11b is removed resulting in the interference force between the post 11 and the cutting member 5 being reduced. As a result the cutters 26 are displaced from the pre-formed pockets 8 at an earlier stage of the drill out process than for cutters not incorporating a relief chamber 27.

The relief chambers 27 within the embodiments presented in FIGS. 11(a) and 11(b) may be further exploited as follows. The cutters 26 or 26b are attached to the cutting members 5 in a manner that provides a hermetic seal between the cutters 26 or 26b and the cutting member 5. As a result a volume of air at atmospheric pressure is trapped within the relief chambers 27. When drilling at depth, the hydrostatic pressure in the wellbore tends to urge the cutters 26 or 26b into the pre-formed pockets 8 of the cutting members 5 effectively strengthening the retention of the cutters 26 or 26b within these pre-formed pockets 8. However, during the drill out process the relief chambers 27 are quickly breached and so the additional strengthening of the retention of the cutter 26 or 26b within the pre-formed pockets 8 provided by the hydrostatic pressure is removed. As a result the force required to detach the cutters 26 or 26b from the cutting members 5 is also correspondingly reduced.

Figure 11C:
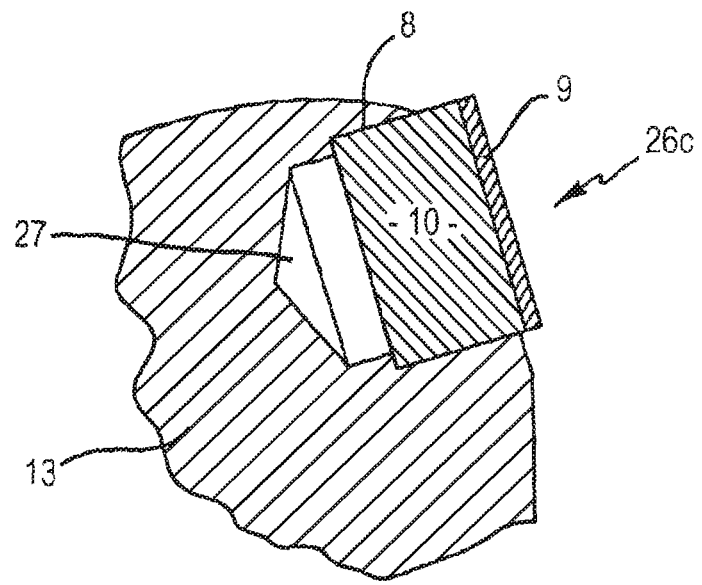

It will be appreciated by those skilled in the art that in an alternative embodiment the relief chambers 27 may be formed within the pre-formed pockets 8 themselves rather than within the post 11 or the support 10b of the cutters 26 or 26b as shown in FIGS. 11(a) and 11(b), respectively. By way of example, FIG. 11(c) presents a cutter 26c located with a pre-formed pocket 8 of a cutting member 5. A relief chamber 27b is formed within the pre-formed pocket 8 such that it interacts with the bottom surface of the support 10 of the cutter 26c in a similar manner to that described above in relation to the embodiments of FIGS. 11(a) and 11(b) i.e. it may act to provide a hermetic seal between the cutters 26c and the cutting member 5. Alternatively, the relief chamber 27b may be arranged to reduce the interference force between the post 11 of the cutter 26 and the cutting member 5.

Figure 12:
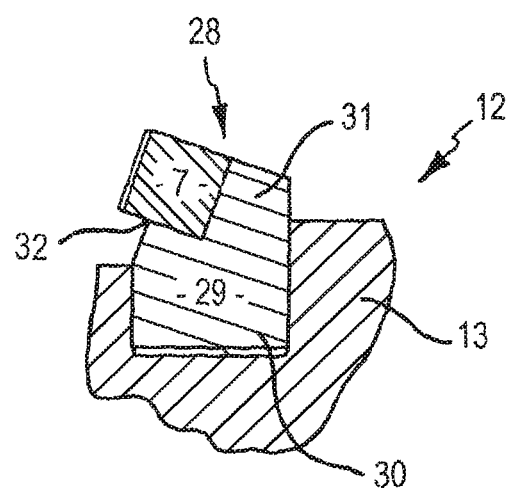
FIG. 12 presents a cross sectional view of a cutter comprising a drillable post and located within a pre-formed pocket.

FIG. 12 presents a cross sectional view of a yet further alternative cutting assembly 28 in accordance with an embodiment of the present invention. The cutting assembly 28 comprises a detachment facilitating feature in the form of a drillable post 29. The drillable post 29 has a first section 30 suitable for forming an interference fit with, or to be brazed to, a pre-formed pocket 8 within the cutting members 5 and a second section 31 that does not form part of the interference fit with, or is not brazed to, the pre-formed pocket 8. Since the drillable post 29 is made from a drillable, non-carbide material the cutter 7 is fixed within a part-pocket 32 located in the second section 31. In particular the drillable post 29 may be formed from steel, bronze or brass. Fixing the cutter 7 within the part-pocket 32 provides the drill bit with cutting assemblies 28 that are mechanically robust for the normal drilling operation.

In the orientation presented in FIG. 12, the drill out process involves the cutting assembly 28, and hence the drillable post 29, being drilled from below by a drill out bit. As a result, the retention forces holding the drillable post 29 in the pre-formed pocket 8 are weakened as the drill out process proceeds to the extent that the cutters 7, along with the second section 31 of the drillable post 29, are dislodged from the cutting members 5 once the first section 30 of the drillable post 29 has been drilled out. Importantly the cutters 7 are dislodged before any contact is made between the drill out bit and the support 10.

It will be appreciated by those skilled in the art that one or more of the above described detachment facilitating features may be incorporated within a cutter assembly so as to provided increased control over the detachment of the cutters during the drill out process. For example one or more structural defects 15 may be incorporated within a cutting assembly that also comprises one or more machined recesses 22, 22b or 22c. Alternatively, cutting assemblies with one or more relief chambers 27 may also comprises a drillable post 29.

The present invention is inherent with significant advantages in that it provides a drill bit with cutters that are mechanically robust for a normal drilling operation but which are modified so as to facilitate detachment during a subsequent drill out procedure. As a result a more reliable drillable drill bit is provided resulting in the time taken for a drilling operation being greatly reduced as there is no need to implement complex and timely retrieval operations to recover apparatus from the well bore. As a result the profitable stage of production can be begin much sooner.

A further advantage is that unlike the drillable drill bits known to the art, the drill bit of the present invention is drillable by another standard drill bit with the risk of damage to the standard drill bit being minimal. As a result there is no need to employ a bespoke drill out bit to drill through the describe drill bit. Furthermore there is no requirement to employ blades of reduced height on the drill out bit in order to maintain its structural integrity.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A cutting assembly suitable for use on a drillable drill bit wherein the cutting assembly comprises:
   one or more cutting members comprising:
      one or more pre-formed pockets; and
      one or more cutters located within the pre-formed pockets, each of the one or more cutters including a cutting surface, a bottom face, and an outer surface extending between the cutting surface and the bottom face,
   wherein the cutting assembly further comprises, for each of the one or more cutters, a single detachment facilitating feature forming an area of reduced brazing capacity limited to the interface between the cutting member and the bottom face of the cutter.

2. The cutting assembly as claimed in claim 1 wherein the area of reduced brazing capacity comprises a non brazeable plating located on the bottom face of the cutter or on the pre-formed pockets.

3. The cutting assembly as claimed in claim 1 wherein the area of reduced brazing capacity comprises a layer of non brazeable material located between the cutter and the pre-formed pockets.

4. The cutting assembly as recited in claim 3, wherein non brazeable material comprises titanium nitride.

5. The cutting assembly as recited in claim 1, wherein the area of reduced brazing capacity comprises a spacer.

6. The cutting assembly as recited in claim 1, wherein the area of reduced brazing capacity consists of a full area of the bottom face.

7. A method of forming a cutting assembly suitable for use on a drillable drill bit wherein the method comprises:
   providing one or more cutting members comprising one or more pre-formed pockets;
   locating one or more cutters within the pre-formed pockets, the one or more cutters including a cutting surface, a bottom face, and an outer surface between the cutting surface and the bottom face;
   for each of the one or more cutters, providing a single detachment facilitating feature providing an area of reduced brazing capacity limited to the interface between the cutting member and the bottom face of the cutter.

8. The method of forming a cutting assembly as claimed in claim 7 wherein the provision of an area of reduced brazing capacity comprises introducing a non brazeable plating on the bottom face of the cutter.

9. The method of forming a cutting assembly as claimed in claim 7 wherein the provision of an area of reduced brazing capacity comprises introducing a non brazeable plating on the pre-formed pockets.

10. The method of forming a cutting assembly as claimed in claim 7 wherein the provision of an area of reduced brazing capacity comprises introducing a non brazeable material between the cutter and the pre-formed pockets.

11. The method of forming a cutting assembly as claimed in claim 7 wherein the provision of an area of reduced brazing capacity further comprises incorporating a non optimal braze alloy composition.

* * * * *